(12) United States Patent
De Barros et al.

(10) Patent No.: US 7,389,022 B2
(45) Date of Patent: Jun. 17, 2008

(54) PHOTOSENSITIVE OPTICAL WAVEGUIDE

(75) Inventors: Carlos De Barros, Boulogne-Billancourt (FR); Lionel Provost, Marcoussis (FR); Hélène Biscaras, Voisins-le-Bretonneux (FR); Christine Moreau, Palaiseau (FR)

(73) Assignee: ALCATEL, Paris (FR)

( * ) Notice: Subject to any disclaimer, the term of this patent is extended or adjusted under 35 U.S.C. 154(b) by 0 days.

(21) Appl. No.: 11/000,006

(22) Filed: Dec. 1, 2004

(65) Prior Publication Data
US 2005/0141833 A1  Jun. 30, 2005

(30) Foreign Application Priority Data
Dec. 2, 2003  (FR)  ................... 03 14122

(51) Int. Cl.
*G02B 6/26* (2006.01)
*G02B 6/02* (2006.01)

(52) U.S. Cl. ............... 385/37; 385/124; 385/123

(58) Field of Classification Search ............ 385/37, 385/123, 124
See application file for complete search history.

(56) References Cited

U.S. PATENT DOCUMENTS

| | | | |
|---|---|---|---|
| 5,852,690 A | 12/1998 | Haggans et al. | |
| 5,881,197 A | 3/1999 | Dong et al. | |
| 6,005,999 A | 12/1999 | Singh et al. | |
| 6,314,221 B1 * | 11/2001 | Riant et al. | 385/37 |
| 6,321,008 B1 * | 11/2001 | Riant et al. | 385/37 |
| 6,836,418 B2 * | 12/2004 | Sakamoto et al. | 365/37 |
| 2003/0142912 A1 * | 7/2003 | Sakamoto et al. | 385/37 |

FOREIGN PATENT DOCUMENTS

| | | |
|---|---|---|
| EP | 1 359 442 A1 | 11/2003 |
| WO | WO 97/26571 A2 | 7/1997 |

OTHER PUBLICATIONS

Holmes M J et al: "Novel fiber design for narrow-band symmetric response sidetap filters with suppressed leaky mode resonance" 25th European Conference on Optical Communication (ECOC '99). Nice, France, Sep. 27-30, 1999. Regular and Invited Papers, European Conference on Optical Communication (ECOC), Paris: See, FR, vol. I of II, Sep. 26, 1999, pp. 216-217, XP002176389.

(Continued)

*Primary Examiner*—K. Cyrus Kianni
(74) *Attorney, Agent, or Firm*—Sughrue Mion, PLLC

(57) ABSTRACT

An optical waveguide suitable for a slanted Bragg grating (SBG) to be written thereinto has a refractive index profile defining a core and a cladding and a specific photosensitivity profile. This photosensitivity profile W(r) is such that, for a given SBG writing angle $\theta$, the coupling of the fundamental mode into itself as counterpropagation in the waveguide, K($\theta$), is substantially zero and such that its derivative K'($\theta$) with respect to the angle $\theta$ is also substantially equal to zero. The zero derivative, and also the zero coupling of the fundamental mode as a function of the angle, means that a widened reflection pocket about the grating write angle is guaranteed.

12 Claims, 9 Drawing Sheets

OTHER PUBLICATIONS

Erdogan T et al: "Tilted Fiber Phase Gratings" Journal of the Optical Society of America—A, Optical Society of America, Washington, US, vol. 13, No. 2, Feb. 1, 1996, pp. 296-313, XP002055129.

Haggans C W et al: "Narrow-Depressed Cladding Fiber Design for Minimization of Claddingmode Losses in Azimuthally Asymmetric Fiber Bragg Gratings" Journal of Lightwave Technology, IEEE. New York, US, vol. 16, No. 5, May 1, 1998, pp. 902-909, XP000772656.

Dong L et at: "Suppression of Cladding Mode Coupling Loss in Fiber Bragg Gratings" Journal of Lightwave Technology, IEEE, New York, US, vol. 18, No. 11, Nov. 2000, pp. 1583-1590, XP000989344.

Liu Y et al: "Fabricating Fibre Edge filters with Arbitrary Spectral Response Based on Tilted Chirped Grating Structures" Measurement Science and Technology, IOP Publication, Bristol, GB, vol. 10, No. 1, Jan. 1999, pp. L01-L03, XP000877675.

\* cited by examiner

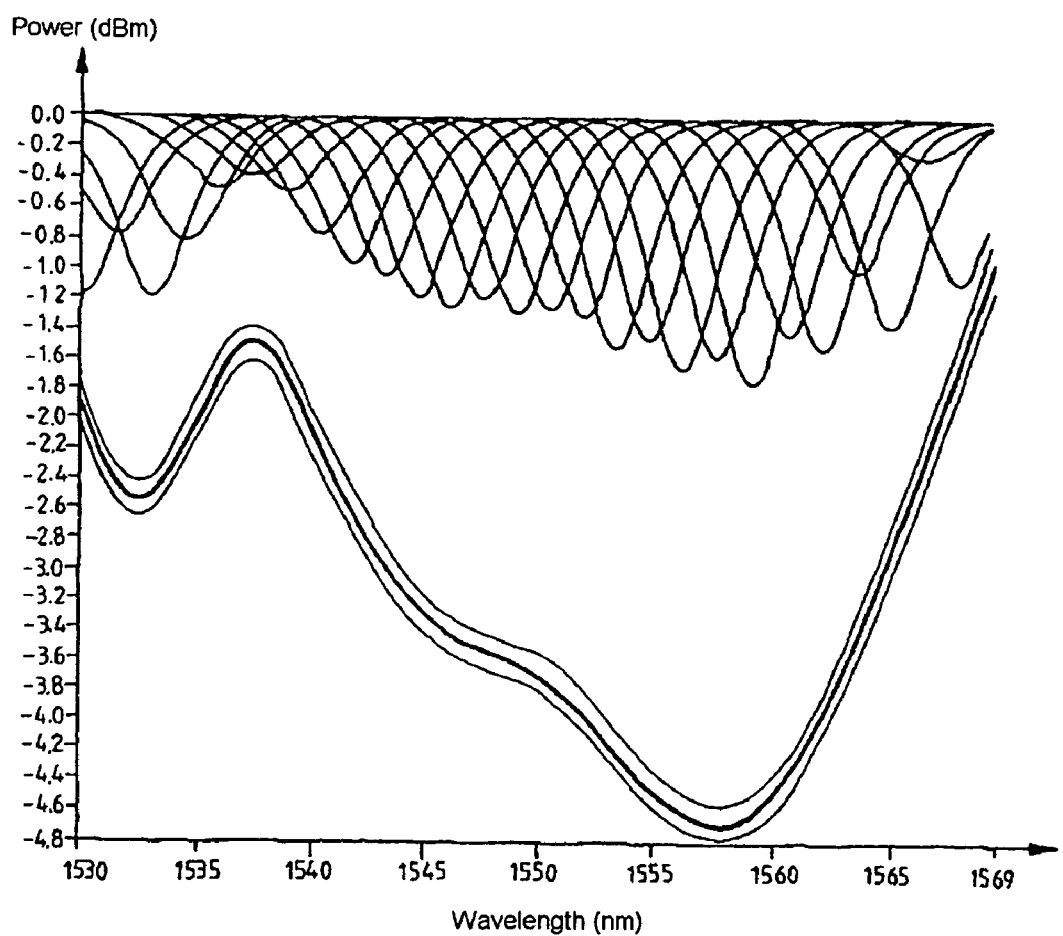
FIG_1
Prior Art

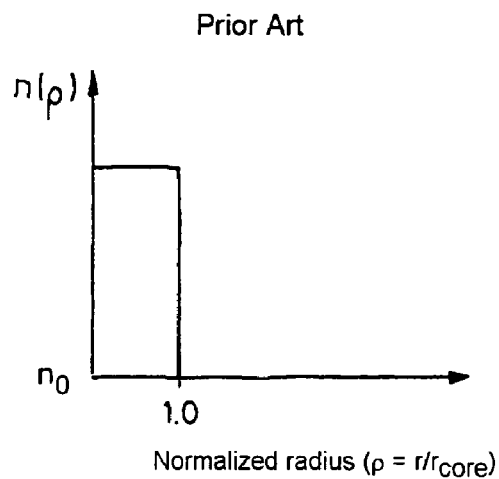
FIG_2a
Prior Art
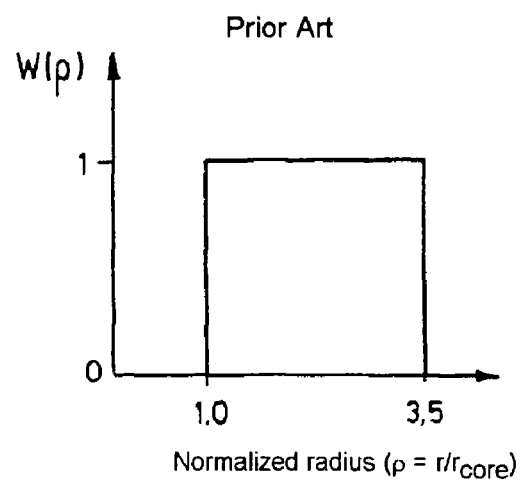
FIG_2b
Prior Art
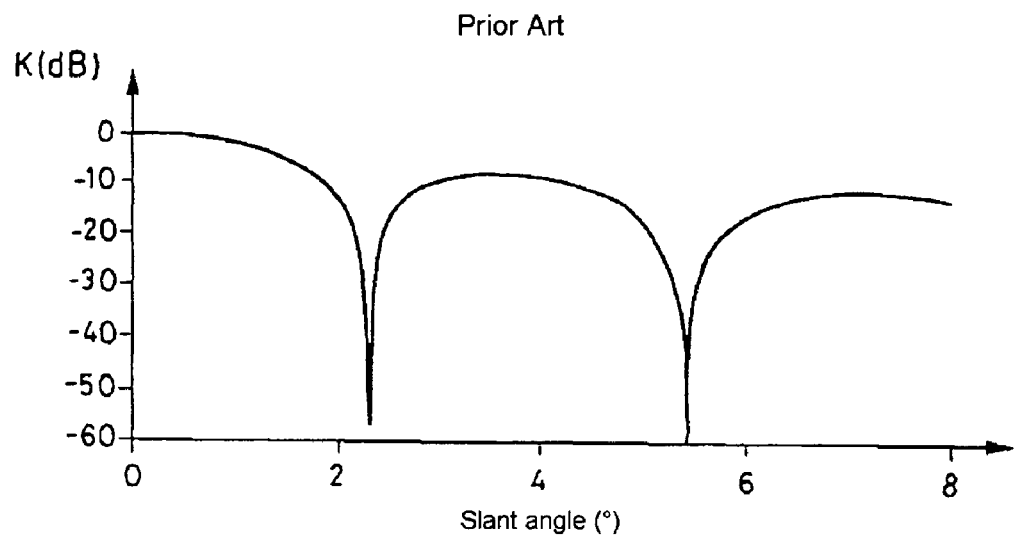
FIG_3
Prior Art

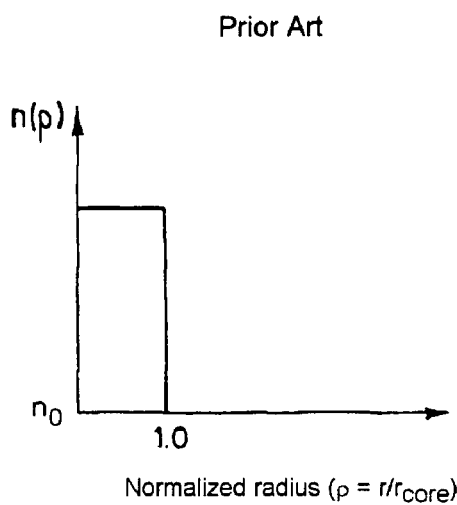
FIG_4a
Prior Art
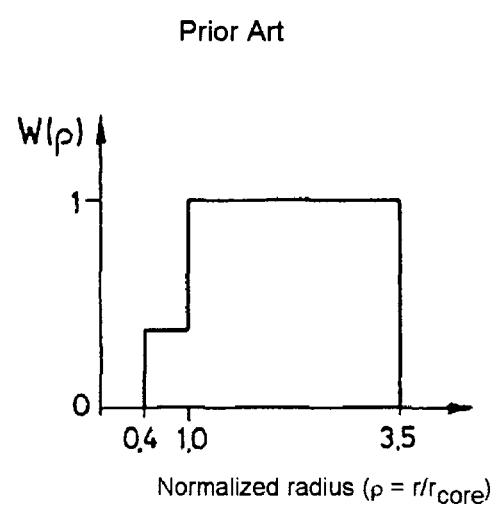
FIG_4b
Prior Art
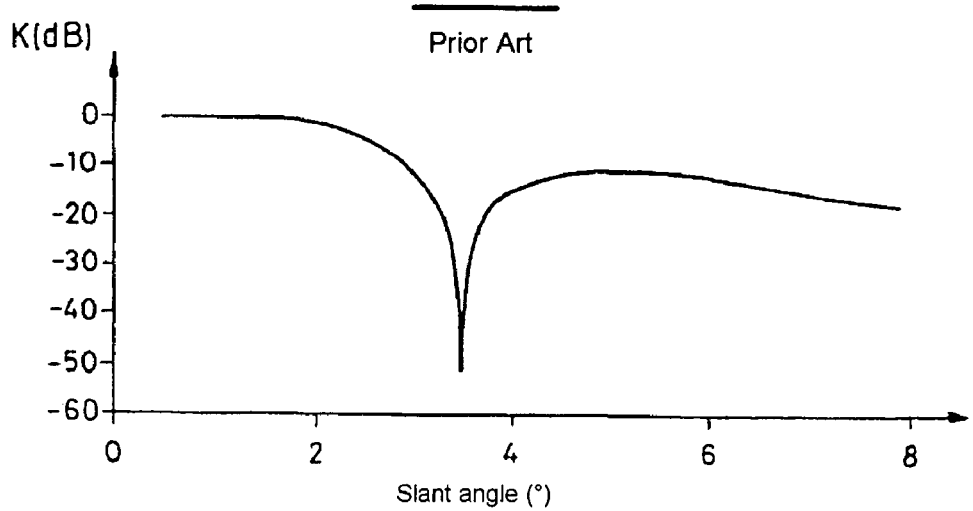
FIG_5
Prior Art

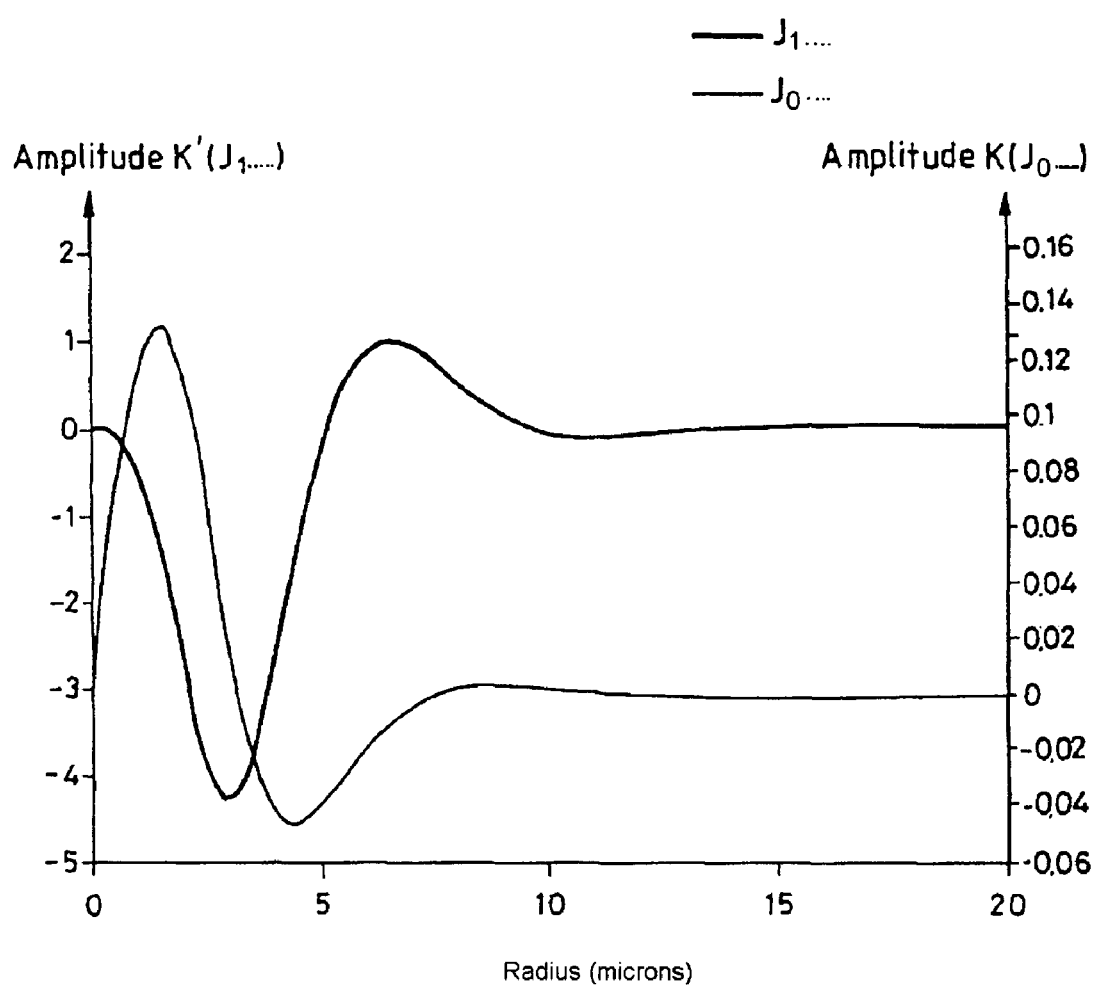

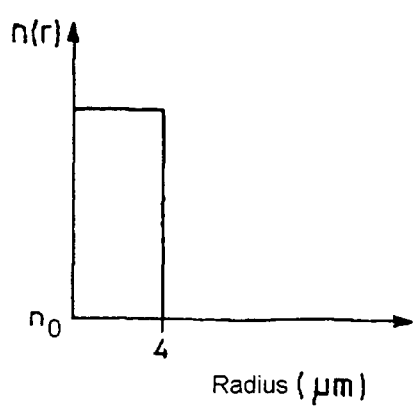
FIG_7a
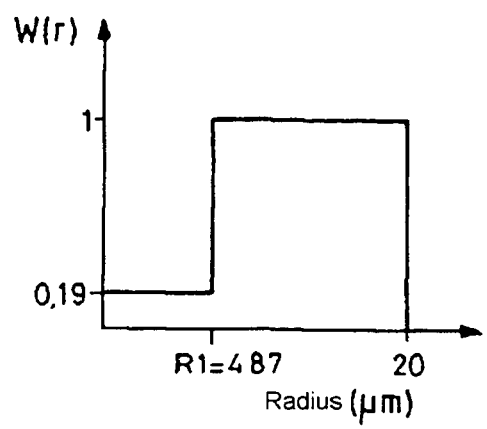
FIG_7b
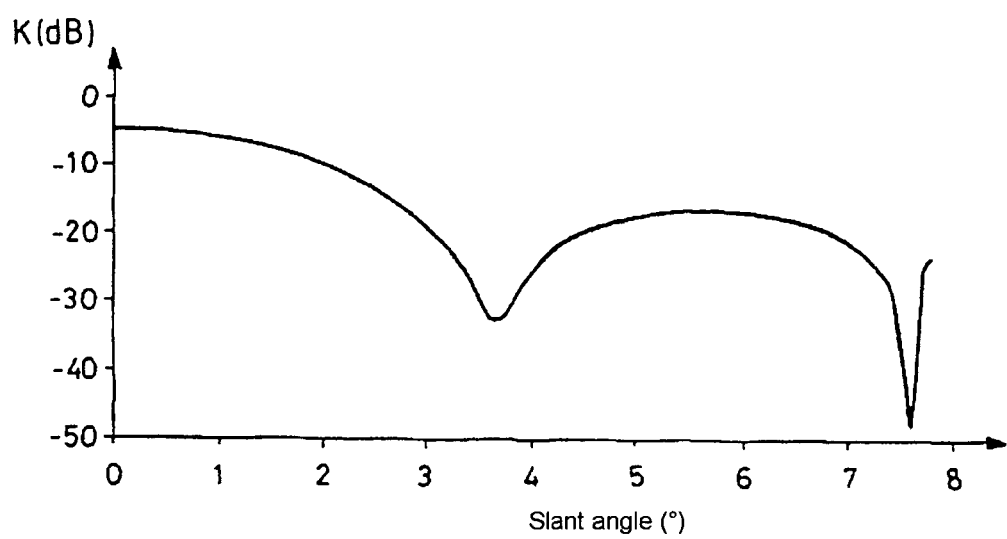
FIG_8

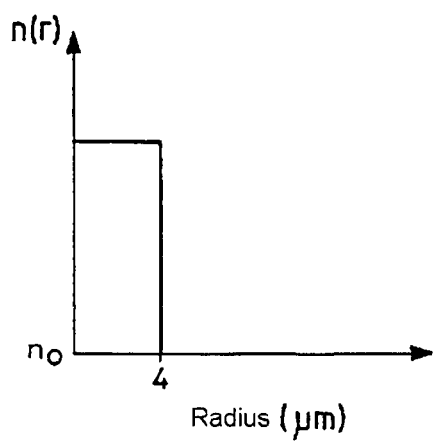
FIG_9a
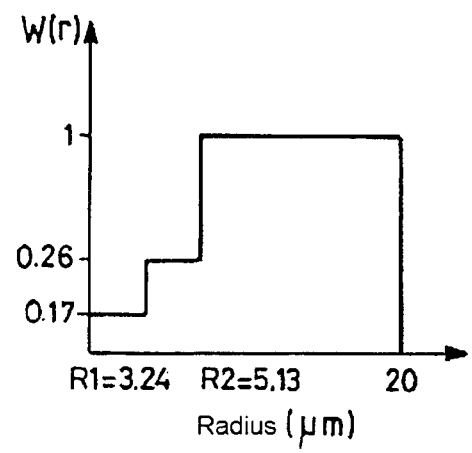
FIG_9b
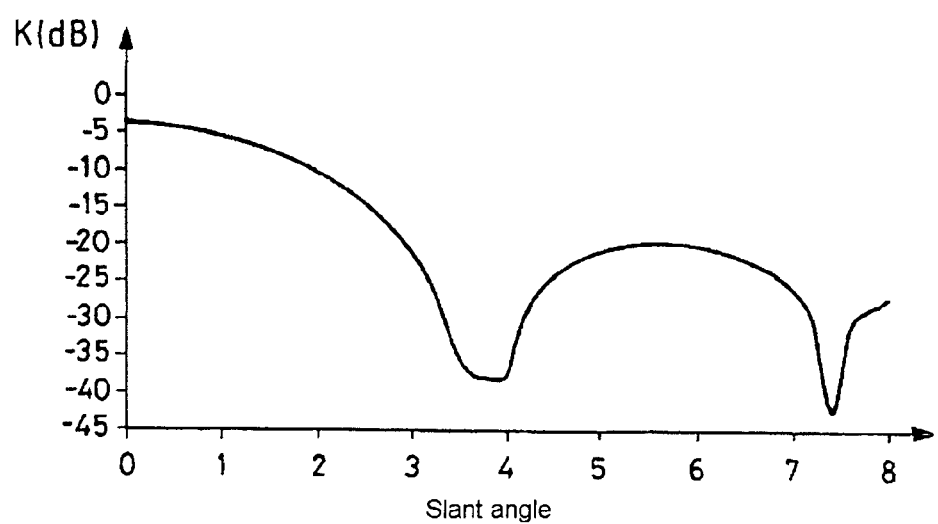
FIG_10

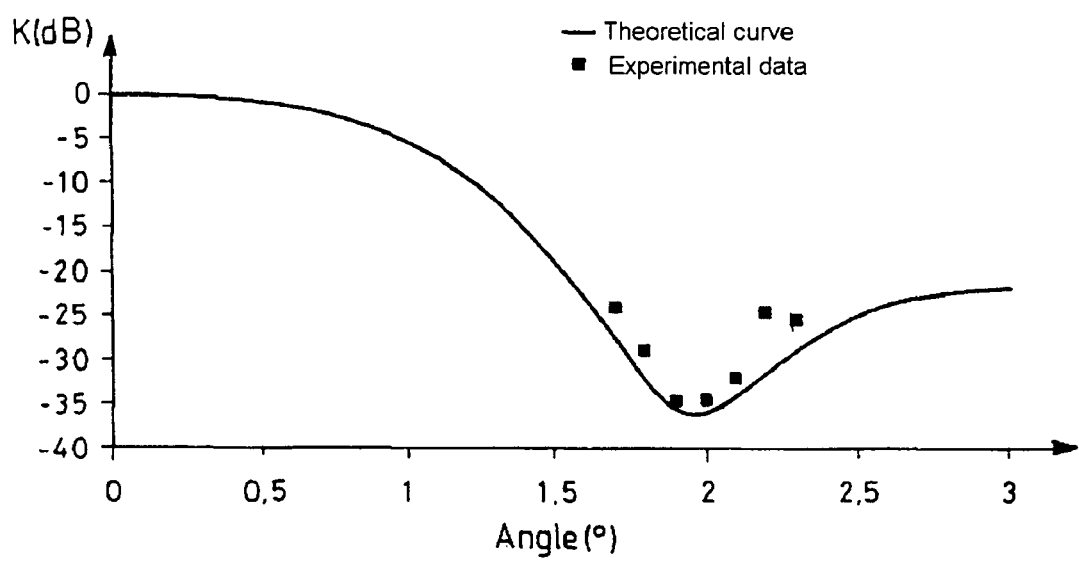
FIG_11

PHOTOSENSITIVE OPTICAL WAVEGUIDE

CROSS-REFERENCE TO RELATED APPLICATIONS

This application is based on French Patent Application No. 03 14 122 filed Dec. 2, 2003. The disclosure of which is hereby incorporated by reference thereto in its entirety, and the priority of which is hereby claimed under 35 U.S.C. §119.

BACKGROUND OF THE INVENTION

The present invention relates to the field of photosensitive optical waveguides suitable for a Bragg grating to be written thereinto, in order to constitute optical filters. The invention relates more particularly to gain flattening filters.

Description of the Prior Art

Gain flattening filters (GFFs) consist in general of Bragg gratings photowritten into portions of waveguide such as optical fibers or planar waveguides. A waveguide conventionally consists of an optical core, whose function is to transmit and possibly amplify an optical signal, surrounded by an optical cladding, whose function is to confine the optical signal to the core. For this purpose, the refractive index of the core $n_1$ and the refractive index of the cladding $n_2$ are such that $n_1 > n_2$. As is well known, the propagation of an optical signal in a monomode waveguide is split into a fundamental mode guided in the core and secondary modes guided over a certain distance in the optical core/cladding assembly, also called cladding modes.

In the case of optical fibers, the index profile is generally designated according to the shape of the graph of the refractive index plotted as a function of the distance along a radius of the fiber. Conventionally, the distance r from the center of the fiber is plotted on the x-axis and the difference between the core refractive index and the cladding refractive index of the fiber is plotted on the y-axis. Thus, an index profile is said to be a "step", "trapezoidal" or "triangular" profile when the respective graphs are in the form of a step, a trapezoid or a triangle. These curves are generally representative of the theoretical or setting profile of the fiber, the manufacturing constraints on the fiber possibly resulting in a substantially different profile. Likewise, in the case of planar optical waveguides, the index profile associates a refractive index value with a distance r from the center of the waveguide, this distance hereafter being referred to as the radial distance.

The core and/or the cladding of the waveguide may be doped so as to be made photosensitive for writing a Bragg grating, for example doped with germanium (Ge). Thus, the photosensitivity profile of a waveguide is defined by the shape of the graph of the radial distribution of the photosensitive dopant concentration in the waveguide.

Gratings conventionally used for gain flattening are slanted or tilted gratings, know as slanted Bragg gratings or SBGs. Such gratings are nonreflective and are designed to allow coupling of the fundamental mode into the cladding modes. It is thus possible to dispense with the optical isolators that are essential when gain flattening is achieved using reflective gratings, such as straight Bragg gratings.

Gain flattening filters are associated with optical amplifiers uniformly distributed along transmission lines. The optical amplifiers do not in general have the same amplification for all the wavelengths of the signals transmitted in the various channels of any one transmission line.

In particular, with the development of dense transmission applications using DWDM (Dense Wavelength Division Multiplexing), the differences in amplification over a given bandwidth have a tendency to be accentuated and the tolerances of gain flatteners become tighter and tighter, that is to say the flattening filter must match the amplification curve as closely as possible. Thus, DWDM applications are requiring the production of narrower and narrower filters exhibiting higher and higher contrast.

Patent application EP 1 359 442 discloses a complex filter composed of a concatenation of slanted Bragg gratings. The spectral response of such a filter is illustrated in FIG. 1. In order to correspond as closely as possible to the amplification curve template (solid line), the elementary filters (fine lines) must have a higher and higher contrast. A specification imposing a 5 dB contrast on a spectral band of around 2 nm is standard for this type of application. Using elementary filters with such a contrast, it is possible to produce a concatenation of filters forming a complex flattening profile corresponding to a given application curve.

One possible way of reducing the spectral width of an elementary filter, while still increasing its rejection ratio (that is to say increasing its contrast), is to improve the mode coupling between the fundamental mode and the cladding modes and thereby to substantially increase the overlap integral between these modes. The overlap integral is defined as the area bounded by the fundamental mode and the cladding modes, weighted by the photosensitivity profile of the waveguide.

Several techniques have been proposed in the prior art for increasing this overlap integral. A first solution may consist in increasing the diameter of the core so as to widen the fundamental mode and thus increase the overlap. However, this solution is limited by the loss of the monomode character of the the signal propagation when the core diameter becomes too large.

Another solution consists in making the cladding photosensitive in addition to the core, in order to increase the weighting of the overlap area. However, this solution means writing a slanted Bragg grating with a high slant angle, of at least 6°, so as to prevent coupling of the fundamental mode into itself and therefore total reflection of the signal. Another solution therefore consists in reducing the photosensitivity of the core in order to prevent coupling of the fundamental mode into itself for lower-angle gratings.

Moreover, reducing the slant angle also makes it possible to reduce the spectral width of the elementary filter formed by a slanted grating. However, the reduction in slant angle remains limited by the need to maintain low backreflection of the signal, that is to say the need to minimize the counterpropagative coupling of the fundamental mode into itself.

Thus, the publication by M. J. Holmes et al. "Ultra Narrowband Optical Fiber Sidetap Filters", ECOC'98, September 1998, Madrid, Spain, pages 137-138, describes a monomode fiber having the index and photosensitivity profiles plotted in FIGS. 2a and 2b respectively. The index profile is a rectangle with a core/cladding step. The units in graph 2a are normalized to the core radius $r_{core}$ and to the index $n_0$ of the cladding. The cladding has been doped with germanium and boron so as to be made photosensitive, while maintaining a refractive index below the index of the core. Such a fiber profile allows an SBG to be written with a low angle of 2.3° so as to obtain a contrasted spectral response.

The value of the write angle was determined by the minimum of the coupling of the fundamental mode into itself when plotted as a function of the angle θ of the grating. Thus, a curve K(θ) is determined, this being plotted in FIG. 3 for the fiber of FIGS. 2a and 2b.

It will be recalled that the theoretical expression for K(θ) is:

$$k(\theta) = \frac{\int E_{core}^2(r) \cdot J_0\left(\frac{2\pi \cdot r \cdot \sin(\theta)}{\Lambda}\right) \cdot W(r) r \cdot dr}{\int E_{core}^2(r) \cdot r \cdot dr} \quad (1)$$

with r, the radius of the fiber
θ the slant angle of the grating,
$E_{core}$, the electric field of the fundamental mode,
W(r), the photosensitivity profile,
Λ, the period of the Bragg grating,
$J_0$, the 1st order Bessel function.

With a rectangular photosensitivity profile, such as that of the fiber of FIG. 2b, the minimum coupling of the fundamental mode into itself, K(θ), has a small angular width of 0.1° at −30 dB, which makes it highly dependent on the angle, that is to say the backreflection of the signal is a minimum for a precise grating write angle. A shift from this angle will entail a sudden increase in the signal backreflection. The tolerance on the SBG write angle for which the coupling of the fundamental mode into itself is minimized is thus termed the "reflection pocket". FIG. 3 shows that the reflection pocket of a grating written into a fiber having a profile corresponding to FIGS. 2a and 2b is very narrow, which complicates the manufacture of the filter.

Many other publications have thus proposed photosensitivity profiles adapted so as to reduce the bandwidth of an elementary filter formed by an SBG. For example, mention may be made of the following publications: C. W. Haggens et al. "Narrow-band rejection filter with negligible backreflection using tilted photoinduced gratings in single mode fibers", IEEE PTL, Vol. 10, No. 5, May 1998; I. Riant et al. "Gain equalisation with optimised Slanted Bragg Grating on adapted fibre for multichannel long haul submarine transmission" OFC Paper ThJ6; and C. De Barros et al. "Optimised C-Band Gain Flattening Filter using Slanted Bragg Technology", ECOC'02, Paper 10.4.1; and also U.S. Pat. No. 6,005,999.

All these publications propose adjusting the photosensitivity of the core relative to the cladding. However, all these profiles produce narrow reflection pockets for the grating write angles.

The publication by M. J. Holmes et al. "Novel fiber design for narrow-band symmetric response sidetap filters with suppressed leaky mode resonance", ECOC'99, Conference Proceedings, pages 216-217, describes another photosensitivity profile for a stepped-index monomode fiber. FIGS. 4a and 4b illustrate the respective refractive index and photosensitivity profiles and FIG. 5 illustrates the coupling of the fundamental mode into itself as a function of the grating write angle, K(θ), in the corresponding fiber.

The photosensitivity profile shows a jump within the fiber core. The fiber core thus has a central region doped with a nonphotosensitive dopant and an annular region doped with a photosensitive dopant and a nonphotosensitive dopant, allowing the refractive index of the core to be kept constant. The signal backreflection curve as a function of the grating angle K(θ) indicates a write angle of 3.5° with an angular width of 0.2° at −30 dB. The "reflection pocket" is somewhat widened by such a fiber profile, allowing a greater tolerance when writing the SBG grating.

Patent application EP 1 160 594 A1 discloses a fiber having a segmented photosensitivity profile within the core and having a nonphotosensitive cladding. Such a fiber allows the Bragg grating to be written with an angle of more than 6°. The angular width at −30 dB may be up to 0.5° with such a fiber profile. However, a write angle as high as this does not allow a narrow filter to be produced. The spectral band of the filter described in the above document is greater than 20 nm, which is unsuitable for a DWDM application.

All the solutions of the prior art are based on a photosensitivity profile that introduces a jump between the core and the cladding of the optical waveguide. By optimizing the photosensitivity between the core and the cladding it is possible to adapt the grating write angle, but does not allow the reflection pocket at this angle to be widened.

SUMMARY OF THE INVENTION

The invention proposes to alleviate the drawbacks of the prior art and provides an optical waveguide having specific index and photosensitivity profiles. The waveguide is thus suitable for a slanted grating to be written thereinto with an increased write angle for which the reflection of the fundamental propagation mode into itself is minimized.

Thus, the subject of the invention is a photosensitive optical waveguide suitable for a slanted Bragg grating (SBG) with a given slant angle (θ) to be written thereinto, the waveguide having a refractive index defining a core and a cladding, and a photosensitivity profile W(r) such that the coupling of the fundamental mode into itself as counterpropagation into the waveguide (K(θ)) and its derivative (K'(θ)) with respect to the angle (θ) are substantially equal to zero for said given SBG writing angle (θ).

According to one characteristic, the photosensitivity profile W(r) has at least one step, the radial position of the photosensitive step being independent of the radial position of an index step between the core and the cladding of the waveguide.

According to one characteristic, the photosensitivity profile W(r) has at least one step located within the cladding of the waveguide.

According to one characteristic, the photosensitivity profile W(r) has at least one step located within the core of the waveguide.

According to one characteristic, the photosensitivity profile W(r) is suitable for writing a slanted Bragg grating (SBG) with an angle (θ) of between 1° and 4.5°.

According to one characteristic, the photosensitivity profile W(r) is such that the minimum in the coupling of the fundamental mode into itself as counterpropagation in the waveguide (K(θ)) has an angular width (Δθ) of between 0.3° and 0.6° about the given angle (θ) into which the Bragg grating (SBG) is written.

The invention also relates to an optical filter comprising at least one slanted Bragg grating (SBG) written into a portion of an optical waveguide as claimed in the invention.

According to one characteristic, the Bragg grating (SBG) has a slant angle of between 1° and 4.5°.

According to one characteristic, the Bragg grating (SBG) has a variable period.

One possible application of the invention is in an optical transmission system that includes a gain flattening filter comprising a concatenation of optical filters according to the invention.

BRIEF DESCRIPTION OF THE DRAWINGS

The features and advantages of the invention will become more clearly apparent on reading the description that follows, given by way of illustration but implying no limitation, with reference to the appended figures in which:

FIG. 1, already described, illustrates a spectral response of a complex gain flattening filter;

FIGS. 2a and 2b, already describe, illustrate the normalized index profile and the normalized photosensitivity profile, respectively, of a first fiber of the prior art;

FIG. 3, already described, illustrates the coupling of the fundamental mode into itself as a function of the grating write angle in a fiber having the profiles of FIGS. 2a and 2b;

FIGS. 4a and 4b, already described, illustrate the normalized index profile and the normalized photosensitivity profile, respectively, of a second fiber of the prior art;

FIG. 5, already described, illustrates the coupling of the fundamental mode into itself as a function of the grating write angle in a fiber having the profiles of FIGS. 4a and 4b;

FIG. 6 shows curves of the coupling of the fundamental mode and of its derivative for given grating angles and index and photosensitivity profiles;

FIGS. 7a and 7b illustrate the index profile and the photosensitivity profile, respectively, of a waveguide according to a first embodiment of the invention;

FIG. 8 illustrates the coupling of the fundamental mode into itself as a function of the grating write angle in a waveguide having the profiles of FIGS. 7a and 7b;

FIGS. 9a and 9b illustrate the index profile and the photosensitivity profile, respectively, of a waveguide according to a second embodiment of the invention;

FIG. 10 illustrates the coupling of the fundamental mode into itself as a function of the grating write angle in a waveguide having the profiles of FIGS. 9a and 9b; and FIG. 11 illustrates a comparison between theory and experiment for the coupling of the fundamental mode as a function of the write angle of a slanted Bragg grating in a fiber according to the invention.

DETAILED DESCRIPTION OF THE PREFERRED EMBODIMENTS

Figure 13:
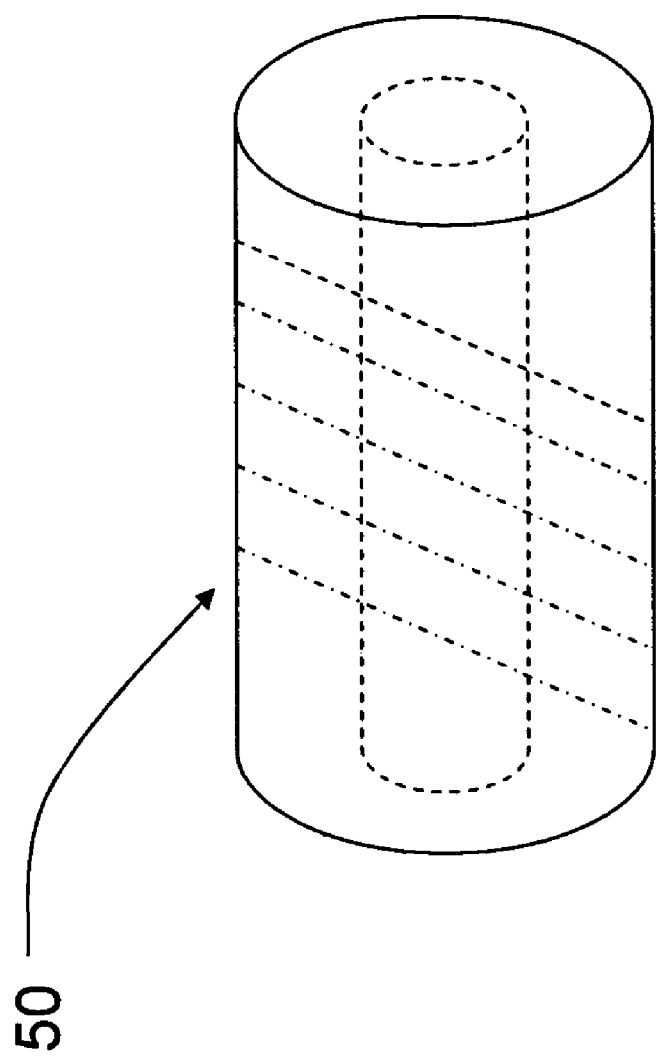
FIG. 13 schematically illustrates an optical waveguide having a core, a cladding and Bragg grating in accordance with an embodiment of the present invention.

According to the invention, an optical waveguide suitable for an SBG to be written thereinto has a refractive index profile defining a core and a cladding, and a specific photosensitivity profile. FIG. 13 illustrates such a waveguide 50 with the SBG written in. This photosensitivity profile $W(r)$ is such that, for a given SBG write angle $\theta$, the coupling of the fundamental mode into itself as counterpropagation in the guide, $K(\theta)$, is essentially zero and its derivative $K'(\theta)$ with respect to the angle $\theta$ is also substantially equal to zero. The zero derivative and the zero coupling of the fundamental mode as a function of the angle mean that a wider reflection pocket around the grating write angle is guaranteed.

In particular, the photosensitivity profile of the waveguide according to the invention is not limited to a distinction between the core and the cladding of the fiber. The radial distribution of the photosensitivity values in the waveguide is therefore independent of an index jump between the core and the cladding.

The aim is no longer to minimize just the above equation (1) for the counterpropagative coupling of the fundamental mode into itself, but to make the following two equations equal to zero:

$$k(\theta) = \int E_{core}^2(r) \cdot J_0\left(\frac{2\pi \cdot r \cdot \sin(\theta)}{\Lambda}\right) \cdot W(r) r \cdot dr = 0 \quad (2)$$

$$\frac{\partial k(\theta)}{\partial \theta} = \quad (3)$$

$$k'(\theta) = -\int E_{core}^2(r) \cdot J_1\left(\frac{2\pi \cdot r \cdot \sin(\theta)}{\Lambda}\right) \cdot W(r) \cdot \frac{2\pi}{\Lambda} \cos(\theta) \cdot r^2 \cdot dr = 0$$

where $J_1$ is the 2nd-order Bessel function.

The electric field of the fundamental mode, $E_{core}(r)$, is set by the index profile of the waveguide. This profile is preferably a rectangular profile with a step between the core and the cladding of the waveguide, which constitutes a conventional monomode fiber profile for example. However, another index profile could be chosen, such as for example a graded-index profile. The sole characteristic defined by the index profile that has an impact on the definition of the photosensitivity profile is the profile of the electric field $E_{core}(r)$ corresponding to the fundamental mode.

The period $\Lambda$ of the SBG grating is set by the wavelength of the signal to be filtered.

According to the invention, it is possible to set the angle $\theta$ of the SBG grating so as to meet the spectral width constraints of the filter, and to determine the photosensitivity profile corresponding to these constraints. It is possible to calculate, from the above equation (1), by an inverse Hankel transformation, an expression for the photosensitivity profile as a function of the electric field profile, for a given coupling function describing the coupling of the fundamental mode into itself, as a function of the angle $\theta$, namely:

$$W(r) = \frac{1}{E_{core}^2(r)} \cdot \int k(\theta) \cdot J_0\left(\frac{2\pi \cdot r \cdot \sin(\theta)}{\Lambda}\right) \cdot \frac{\sin(\theta) \cdot \cos(\theta)}{\Lambda^2} d\theta \quad (4)$$

However, a precise solution to such an expression is difficult to find.

The aim is therefore to determine the suitable photosensitivity profile by plotting equations (2) and (3). The curves corresponding to these equations as a function of r are plotted in FIG. 6 by setting $W(r)=1$, $\Lambda=0.55$ nm, $\theta=3.75°$ and by modeling a fiber with a core radius of 4 microns and a core/cladding index step of $4.4 \times 10^{-3}$.

The radial distribution to be assigned to $W(r)$ that makes the integrals of these two functions zero has to be determined. The integrals can be decomposed into N segments and the weight of $W(r)$ in each segment can be determined. To do this, it will be assumed that the photosensitivity profile is a step function, with successive values $\alpha_n$.

The following two equations must then be solved:

$$k(\theta) = \sum_2^N \alpha_n \int_{Rn-1}^{Rn} E_{core}^2(r) \cdot J_0\left(\frac{2\pi \cdot r \cdot \sin(\theta)}{\Lambda}\right) \cdot r \cdot dr = \sum_2^N \alpha_n k_n(\theta) = 0 \quad (5)$$

-continued $$k'(\theta) = -\sum_{2}^{N} \alpha_n \int_{Rn-1}^{Rn} E_{core}^2(r) \cdot J_1\left(\frac{2\pi \cdot r \cdot \sin(\theta)}{\Lambda}\right) \cdot \frac{2\pi}{\Lambda} \cos(\theta) \cdot r^2 \cdot dr =$$

$$\sum_{2}^{N} \alpha_n k'_n(\theta) = 0$$

The number of steps, i.e. N, may be set and then the values of $\alpha_n$ between 0 and 1, with $\alpha_N=1$, and the corresponding values of $R_n$, with $R_N=20$ µm, may be determined.

$R_N$ is set to 20 µm, as above this radius the field of the fundamental mode is zero. It is therefore unnecessary to extend the photosensitivity region beyond this radius.

$\alpha_n$ is set to 1, since the coupling in the cladding must always be a maximum, given that the field of the fundamental mode tends towards zero in the cladding.

FIGS. 7a and 7b illustrate the index and photosensitivity profiles of a fiber according to a first embodiment of the invention, for an application with an index profile consisting of two steps (N=2). The two equations (5) therefore give:

$$\alpha_1 = \frac{k_2}{k_1} = \frac{k'_2}{k'_1}.$$

The above set values of the index profiles and of the Bragg grating characteristics give $\alpha_1=0.19$ and $R_1=4.87$ µm. It may be clearly seen that the index profile is completely uncorrelated with the photosensitivity profile, the photosensitivity step not coinciding with the index step of the fiber.

The curve illustrated in FIG. 8, showing the counterpropagation of the fundamental mode of the signal, is then obtained. For a set write angle of 3.75°, the width at 30 dB is 0.4°, which constitutes a substantially wider reflection pocket compared to the backreflection curves of the prior art for write angles as low as this.

Other numerical examples have been calculated in the same manner for a photosensitivity profile consisting of two steps. If the SBG write angle is 2.5°, the following pair is obtained: $\alpha_1=0.05$ and $R_1=6.3$ µm; if the SBG write angle is 4.35°, the pair obtained is $\alpha_1=0.3$ and $R_1=4.32$ µm.

FIGS. 9a and 9b illustrate the index and photosensitivity profiles of a fiber according to a second embodiment of the invention, for an application with a photosensitivity profile consisting of three steps (N=3). The two equations (5) then give:

$$\alpha_1 k_1 + \alpha_2 k_2 + k_3 = 0$$

$$\alpha_1 k'_1 + \alpha_2 k'_2 + k'_3 = 0$$

It is possible, for example, for the settings to be such that the radii of the two segments $R_1$ and $R_2$ correspond to the roots of the Bessel functions $J_0$ and $J_1$. The areas $k_1$, $k_2$, $k_3$, $k'_1$, $k'_2$, $k'_3$ may then be calculated and the second-degree equation solved in order to determine $\alpha_1$ and $\alpha_2$:

$$\begin{cases} \alpha_1 = \dfrac{k'_3 \cdot k_1 - k'_1 \cdot k_3}{k'_1 \cdot k_2 - k'_2 \cdot k_1} \\ \alpha_2 = \dfrac{k'_3 \cdot k_2 - k'_2 \cdot k_3}{k'_2 \cdot k_1 - k'_1 \cdot k_2} \end{cases}$$

The above set values of the index profiles and of the Bragg grating characteristics give $\alpha_1=0.176$ and $\alpha_2=0.26$, with $R_1=3.24$ µm and $R_2=5.13$ µm. Of course, other values of $R_1$ and $R_2$ may be set.

The coupling curve illustrated in FIG. 10, corresponding to the coupling of the fundamental mode into itself, is then obtained. For a write angle set to 3.75°, the width at −30 dB is 0.7°.

The invention therefore makes it possible to produce an optical waveguide suitable for a slanted Bragg grating to be written thereinto with a chosen angle, while increasing the tolerance on this write angle. Thus, it is possible to determine the SBG angle for the desired applications and to produce the appropriate waveguide that will allow said grating to be written, with a low scrap rate during industrial manufacture of the filter.

For example, a fiber according to the invention may be manufactured with precise control of the dopant concentrations during the production of the preform, in particular the germanium (Ge), phosphorus (P) and fluorine (F) concentrations.

FIG. 11 shows a Bragg grating that can be written with an in-fiber angle slant varying from 1.7° to 2.3° in a fiber according to the invention. This shows the theoretical back-reflection and that obtained experimentally. The "reflection pocket" of the backreflection minimum in such a fiber is almost 1°. This allows better manufacturing tolerance and makes it possible to have a sufficiently low experimental level of reflection (identical to the theoretical predictions).

Figure 12:
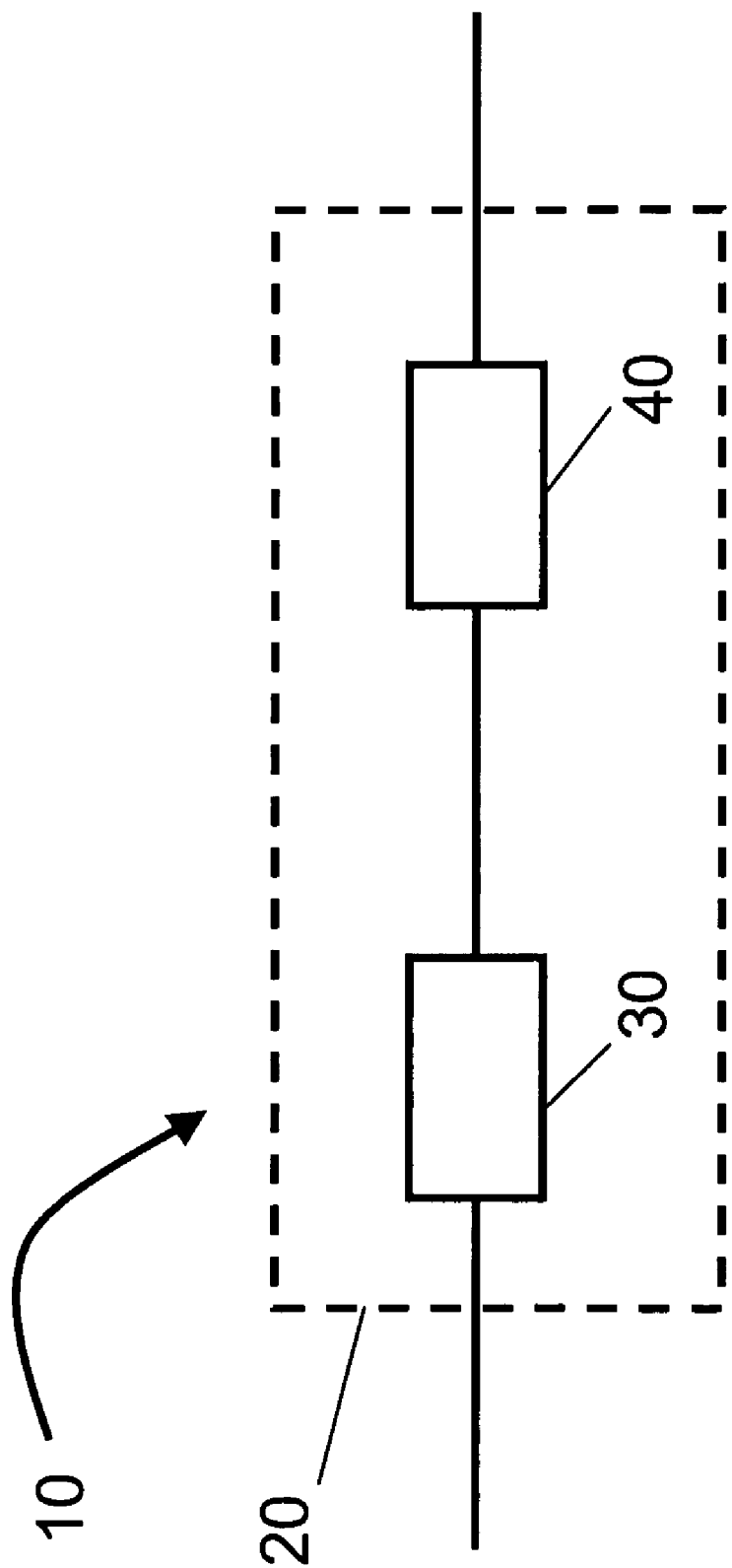
FIG. 12 illustrates with graphical symbols an optical system that includes gain flattening filter having a concatenation of optical filters.

FIG. 12 illustrates graphically an optical transmission system 10 having a gain flattening filter 20 made up of a series of filters 30, 40 in accordance with an embodiment of the present invention.

The invention claimed is:

1. A photosensitive optical waveguide, comprising:
a core;
a cladding;
a refractive index defining the core and the cladding;
a slanted Bragg grating, SBG, with a given slant angle, θ, written into the optical waveguide; and
a photosensitivity profile, W(r), such that:

$$k(\theta) = \int E_{core}^2(r) \cdot J_0\left(\frac{2\pi \cdot r \cdot \sin(\theta)}{\Lambda}\right) \cdot W(r) r \cdot dr$$

$$\frac{\partial k(\theta)}{\partial \theta} = k(\theta) = -\int E_{core}^2(r) \cdot J_1\left(\frac{2\pi \cdot r \cdot \sin(\theta)}{\Lambda}\right) \cdot W(r) \cdot \frac{2\pi}{\Lambda} \cos(\theta) \cdot r^2 \cdot dr$$

where: r is the radius of the fiber
θ is the slant angle of the grating,
$E_{core}$ is the electric field of the fundamental mode,
W(r) is the photosensitivity profile,
Λ is the period of the Bragg grating, and
$J_0$ is the 1st order Bessel function; and
wherein k(θ) is a minimum and k'(θ) is a minimum for the given SBG slant angle, θ, and wherein W(r) has at least one photosensitive step, and a radial position of the photosensitive step being independent of a radial position of an index step between the core and the cladding of the waveguide.

2. The waveguide as claimed in claim 1, wherein the photosensitivity profile W(r) has at least one step located within the cladding of the waveguide.

3. The waveguide as claimed in claim 1, wherein the photosensitivity profile W(r) has at least one step located within the core of the waveguide.

4. The waveguide as claimed in claim 1, wherein the photosensitivity profile W(r) is suitable for writing a slanted Bragg grating (SBG) with a slant angle (θ) of between 1° and 4.5°.

5. The waveguide as claimed in claim 1, wherein the photosensitivity profile W(r) is such that the minimum in the coupling of the fundamental mode into itself as counter-propagation in the wave guide (K(θ)) has an angular width (Δθ) of between 0.30° and 0.60° about the given angle (θ) into which the Bragg grating (SBG) is written.

6. An optical filter comprising at least one slanted Bragg grating (SBG) written into a portion of an optical waveguide as claimed in claim 1.

7. The optical filter as claimed in claim 6, wherein the slanted Bragg grating (SBG) has a slant angle of between 10° and 4.5°.

8. The optical filter as claimed in claim 6, wherein the slanted Bragg grating (SBG) has a variable period (Λ).

9. An optical transmission system that includes a gain flattening filter comprising a concatenation of optical filters as claimed in claim 6.

10. The photosensitive optical waveguide according to claim 1, wherein k(θ) is zero or substantially equal to zero and k'(θ) is zero or substantially equal to zero.

11. The photosensitive optical waveguide according to claim 1, wherein the refractive index profile is uncorrelated with the photosensitivity profile and wherein there is no step in the photosensitivity profile at a radial position of the waveguide having a refractive index step.

12. The photosensitive optical waveguide according to claim 11, wherein the photosensitivity profile is independent of the refractive index change between the core and the cladding.

* * * * *